(12) United States Patent
Zhang et al.

(10) Patent No.: US 10,078,704 B2
(45) Date of Patent: Sep. 18, 2018

(54) METHOD AND DEVICE FOR DISPLAYING MICROBLOG DYNAMICS, AND COMPUTER STORAGE MEDIUM

(71) Applicant: TENCENT TECHNOLOGY (SHENZHEN) COMPANY LIMITED, Shenzhen, Guangdong (CN)

(72) Inventors: Jing Zhang, Shenzhen (CN); Xiaomin Hou, Shenzhen (CN); Yang Zhao, Shenzhen (CN); Liwei Qiao, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 759 days.

(21) Appl. No.: 14/475,705

(22) Filed: Sep. 3, 2014

(65) Prior Publication Data

US 2014/0372422 A1 Dec. 18, 2014

Related U.S. Application Data

(63) Continuation of application No. PCT/CN2013/076790, filed on Jun. 5, 2013.

(30) Foreign Application Priority Data

Jun. 6, 2012 (CN) .......................... 2012 1 0184612

(51) Int. Cl.
*G06F 17/30* (2006.01)
*G06Q 30/00* (2012.01)
(Continued)

(52) U.S. Cl.
CPC ......... *G06F 17/3087* (2013.01); *G06Q 30/00* (2013.01); *H04L 67/18* (2013.01); *H04W 4/023* (2013.01)

(58) Field of Classification Search
USPC ......................................................... 707/724
See application file for complete search history.

(56) References Cited

U.S. PATENT DOCUMENTS

2007/0203644 A1 8/2007 Thota et al.
2008/0158249 A1* 7/2008 Jarczyk ................. G06F 3/0481
345/619

(Continued)

FOREIGN PATENT DOCUMENTS

CN 101299769 A 11/2008
CN 102147903 A 8/2011
WO WO 2013/182055 A1 12/2013

OTHER PUBLICATIONS

Canadian Office Action dated Feb. 26, 2016 in corresponding Canadian Patent Application No. 2,869,441.

(Continued)

*Primary Examiner* — Syling Yen
*Assistant Examiner* — Bao Tran
(74) *Attorney, Agent, or Firm* — Sughrue Mion, PLLC

(57) ABSTRACT

Various embodiments of the present invention disclose a method for displaying microblog dynamics. The method includes: obtaining a microblog viewing request containing first location information; searching microblog dynamic information containing second location information, wherein a distance between the first location and the second location is within a preset range; and obtaining an electronic map corresponding to the first location information, and showing the microblog dynamic information in a location corresponding to the second location information on the electronic map. Various embodiments of the present invention also provide a device for displaying microblog dynamics and a computer storage medium.

19 Claims, 4 Drawing Sheets

(51) Int. Cl.
*H04L 29/08* (2006.01)
*H04W 4/02* (2018.01)

(56) References Cited

U.S. PATENT DOCUMENTS

| | | | |
|---|---|---|---|
| 2010/0061701 A1* | 3/2010 | Iwane | G06F 17/30817 |
| | | | 386/241 |
| 2010/0115459 A1* | 5/2010 | Kinnunen | G01C 21/20 |
| | | | 715/785 |
| 2010/0171763 A1* | 7/2010 | Bhatt | G06F 17/30274 |
| | | | 345/660 |
| 2011/0179064 A1 | 7/2011 | Russo | |
| 2011/0238762 A1 | 9/2011 | Soni et al. | |
| 2011/0276398 A1 | 11/2011 | Peng | |
| 2012/0011103 A1* | 1/2012 | Joo | G06F 17/30864 |
| | | | 707/687 |
| 2013/0330055 A1* | 12/2013 | Zimmermann | H04N 21/2743 |
| | | | 386/240 |
| 2014/0298224 A1* | 10/2014 | Arita | G01C 21/367 |
| | | | 715/765 |
| 2014/0372422 A1 | 12/2014 | Zhang et al. | |

OTHER PUBLICATIONS

Chinese Office Action dated Nov. 14, 2014 in corresponding Chinese Patent Application No. 201210184612.1.
International Search Report dated Aug. 15, 2013, in corresponding International Patent Application No. PCT/CN2013/076790.
Canadian Office Action dated Sep. 14, 2017 in corresponding Canadian Patent Application No. 2,869,441.

* cited by examiner

METHOD AND DEVICE FOR DISPLAYING MICROBLOG DYNAMICS, AND COMPUTER STORAGE MEDIUM

CROSS-REFERENCE TO RELATED APPLICATIONS

This application is a continuation of International Application No. PCT/CN2013/076790 filed on Jun. 5, 2013, which claims priority to Chinese Patent Application No. 201210184612.1 filed on Jun. 6, 2012, the contents of which are incorporated by reference herein in their entirety.

FIELD OF THE INVENTION

Various embodiments of the present invention relate to network technology, in particular, to a method and device for displaying microblog dynamics, and computer storage medium.

BACKGROUND OF THE INVENTION

In social networks such as microblog platforms, people are often interested in neighbouring network dynamics. For example, users generally expect to know who are in the surrounding area and what happened to them. In particular, with the development of mobile terminals, the clients of the majority of social networks can be installed on mobile terminals, and people are always interested in other users in the same social network, or information in the surrounding area, and hope to interact with the other users in the surrounding area when arriving at some place. Therefore, showing for the dynamics of the neighbouring social networks is of great significance for the users.

Take microblog as an example, a traditional way to show microblog dynamic information is: positioning the location of a certain user first, and then searching dynamic information within a pre-set distance range through a mobile base station or a GPS (global positioning system) positioning, and finally displaying the found dynamic information result in a list. In this way, users can select interaction objects or know what happened in the surrounding area according to the list.

However, since the traditional way shows the microblog dynamic information in the form of a list, with the distance of the found dynamic information (which usually is user information) displayed in the list, the specific location of the neighbouring network dynamic information cannot be visually shown. Moreover, with this traditional way to show microblog dynamic information, it is inconvenient to view all the neighbouring social network dynamics.

SUMMARY OF THE INVENTION

It is thereby necessary to provide a method and device for displaying microblog dynamics, which are more flexible and capable of improving the operation convenience of users, and a computer storage medium.

A method for displaying microblog dynamics, comprising:

obtaining a microblog viewing request containing first location information, wherein the first location information includes any one of a real geographic location where a user is located and a geographic location set by the user;

searching for microblog dynamic information containing second location information, of which a distance between the first location and the second location is within a preset range; and obtaining an electronic map corresponding to the first location information, and showing the microblog dynamic information in a location corresponding to the second location information on the electronic map.

A device for displaying microblog dynamics, comprising:

a starting module, configured to obtain a microblog viewing request containing first location information, wherein the first location information includes any one of a real geographic location where a user is located and a geographic location set by the user;

a searching module, configured to search for microblog dynamic information containing second location information, wherein a distance between the first location and the second location is within a preset range; and a showing module, configured to obtain an electronic map corresponding to the first location information, and configured to show the microblog dynamic information in a location corresponding to the second location information on the electronic map.

One or more computer storage media including computer executable instruction which is used for executing a method for displaying microblog dynamics, wherein the method comprises:

obtaining a microblog viewing request containing first location information, wherein the first location information includes any one of a real geographic location where a user is located and a geographic location set by the user;

searching for microblog dynamic information containing second location information, wherein a distance between the first location information and the second location is within a preset range; and obtaining an electronic map corresponding to the first location information, and showing the microblog dynamic information in a location corresponding to the second location information on the electronic map.

According to the above-mentioned method and device for displaying microblog dynamics and the above-mentioned computer storage medium, a microblog viewing request containing first location information is obtained, and microblog dynamic information containing second location information, wherein a distance between the first location and the second location is within a preset range, is searched for; and an electronic map corresponding to the first location information is obtained, and the microblog dynamic information is shown in a location corresponding to the second location information on the electronic map. The location where the microblog dynamic information is shown on the electronic map is corresponding to an actual geographic location thereof, so that a user can obtain the actual geographic location of the microblog dynamic information by viewing the electronic map. Thus, by means of the method and device for displaying microblog dynamics, the specific location of the microblog dynamic information adjacent to the user can be displayed. Further, all microblog dynamic information can be shown on the electronic map, thus facilitating the user's operation.

DETAILED DESCRIPTION OF THE EMBODIMENTS

Figure 1:
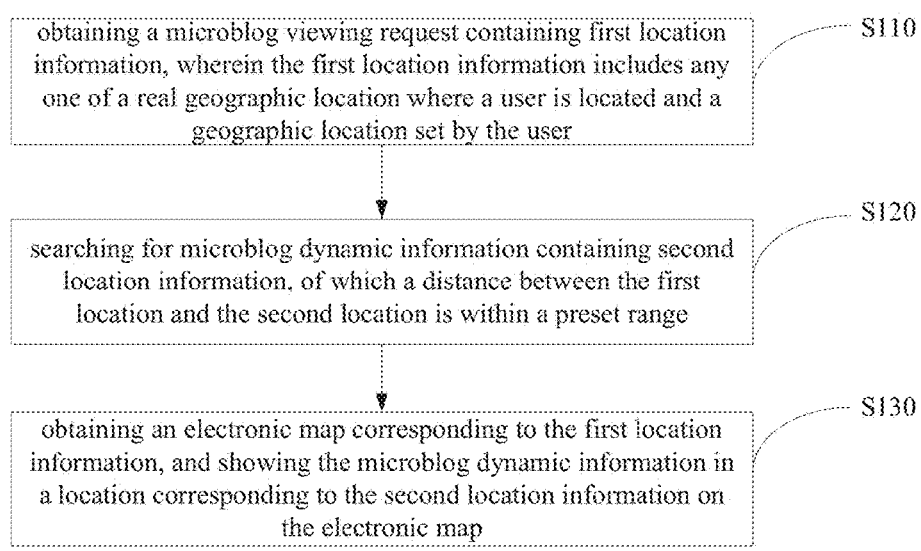
FIG. 1 is a flow schematic diagram of a method for displaying microblog dynamics in accordance with an embodiment.

As shown in FIG. 1, in accordance with an embodiment, a method for displaying microblog dynamics includes the following steps:

Step S110, obtaining a microblog viewing request containing first location information, wherein the first location information includes any one of a real geographic location where a user is located and a geographic location set by the user.

In an embodiment, a specific key can be arranged on a terminal device, and the microblog viewing request is obtained while the user clicks the key. In another embodiment, the user interface of a microblog platform can be shown after the user logs in the microblog platform. A function button or a menu item corresponding to the microblog viewing request can be set on the user interface, and the microblog viewing request is obtained while the user clicks the function button or selects the menu item. A surrounding map mode is entered after the microblog viewing request is obtained.

Specifically, the real geographic location where the user is located may be GPS positioning information, and the GPS positioning information of the user (that is, the longitude and latitude of the current location of the user) can be obtained by a GPS positioning module arranged in the terminal device. In addition, a geographic location input by the user can also be obtained by the user interface, or a clicking instruction of the user can be obtained by the electronic map, and a geographic location corresponding to the clicking instruction on the electronic map (that is, the geographic location set by the user) is further obtained.

Step S120, searching for microblog dynamic information containing second location information, wherein the distance between the first location and the second location is within a pre-set range.

The microblog dynamic information may include user profile information and microblog contents, wherein the user profile information may be the personal data related information on the microblog platform, such as accounts, names, avatars, etc. The contents of the microblog are information posted by the users.

In the microblog platform, the microblog dynamic information has a corresponding relationship with a certain geographic location (longitude and latitude), for example, a geographic location corresponding to the user profile information is used for indicating the current location of the user, and a geographic location corresponding to a microblog content is used for indicating the location where the user posts the microblog content.

In an embodiment, the second location information of the user profile information is obtained in real time. Specifically, a user logging in the microblog platform in a set area is inquired, and the second location information of the user profile information is obtained according to the geographic location uploaded by the user in real time. The second location information of the microblog contents can be obtained from the terminal device. When microblog content is released, the geographic location of the release location can be correspondingly stored. Specifically, when searching the microblog contents, the microblog contents are obtained together with the second location information of the microblog content simultaneously from the terminal device.

Specifically, the microblog dynamic information can be searched within a range taking the first location information as a circle centre and taking a preset distance as a radius. Further, the second location information corresponding to the microblog dynamic information can be obtained, the distance between the first location information and the second location information of the microblog dynamic information is calculated according to the first location information and the second location information, and the microblog dynamic information of which the distance is within the preset range is selected.

Step S130, obtaining an electronic map corresponding to the first location information, and showing the microblog dynamic information in a location corresponding to the second location information on the electronic map.

Specifically, the electronic map can be pre-stored on the terminal device, and can be directly extracted from the terminal device and shown. Or the data of the electronic map can be directly obtained from a third-party map platform, and the electronic map is shown on the user interface.

Further, after the first location information is obtained, the electronic map is shown on the user interface according to the first location information, the central location of the displaying area of the electronic map in the user interface is corresponding to the first location information, and the location information can be marked on the electronic map. Further, operation instructions of the user on the electronic map can also be obtained, and operations such as dragging, scaling and the like can be executed on the electronic map.

Specifically, any point on the electronic map is correspondingly provided with a unique longitude and a unique latitude, and the second location information of the microblog dynamic information is also longitude and latitude information. The point with identical longitude and latitude to the microblog dynamic information is positioned on the electronic map, and the point is the corresponding location of the microblog dynamic information on the electronic map. Accordingly, the microblog dynamic information is shown in the corresponding location.

In an embodiment, a scaling instruction onto the electronic map can be obtained, and the proportional scale of the electronic map is adjusted according to the scaling instruction. When the proportional scale of the electronic map is changed, the corresponding location of the microblog dynamic information on the electronic map is re-obtained, and the location of the microblog dynamic information is adjusted, so that the microblog dynamic information is re-shown in the corresponding location on the electronic map.

In an embodiment, the method for displaying microblog dynamics further includes: obtaining the proportional scale of the electronic map, calculating a display distance among the microblog dynamic information on the electronic map according to the second location information and the proportional scale of the electronic map, and when the display distance is less than or equal to a preset distinguishable distance, showing multiple pieces of microblog dynamic information in a location corresponding to the second location information on the electronic map in a partial overlapping manner.

Specifically, an actual distance between two pieces of the microblog dynamic information can be obtained according to the second location information of the microblog dynamic information, the actual distance means a distance between the corresponding actual geographic locations of the two pieces of the microblog dynamic information, and the display distance between the microblog dynamic information on the electronic map results from a product of the actual distance between the two pieces of the microblog dynamic information and the proportional scale of the electronic map. For example, the two pieces of the microblog dynamic information shown on the electronic map are a user A and a user B respectively, the actual distance between the user A and the user B obtained according to the second location information of the user A and the user B is 1000 m, and the current proportional scale of the electronic map is 1:50000, then the display distance between the user A and the user B on the electronic map is 0.02 m.

The distinguishable distance means the minimum distinguishable distance of user operations, preferably, with a configuration for a touch-screen device, the distinguishable distance can be set to the fingertip width of a normal human finger. Further, multiple pieces of microblog dynamic information with the display distance which is less than or equal to the preset distinguishable distance can be shown in a location corresponding to the second location information on the electronic map in a partial overlapping manner.

Specifically, in an embodiment, after the multiple pieces of microblog dynamic information with the display distance which is less than or equal to the preset distinguishable distance are aggregated, the multiple pieces of microblog dynamic information can be partially overlapped as the aggregated microblog dynamic information to be shown on the electronic map. The second location information of the aggregated microblog dynamic information may be the second location information of any one of the aggregated multiple pieces of microblog dynamic information, or may be the central location of the second location information of the aggregated multiple pieces of microblog dynamic information.

Figure 2:
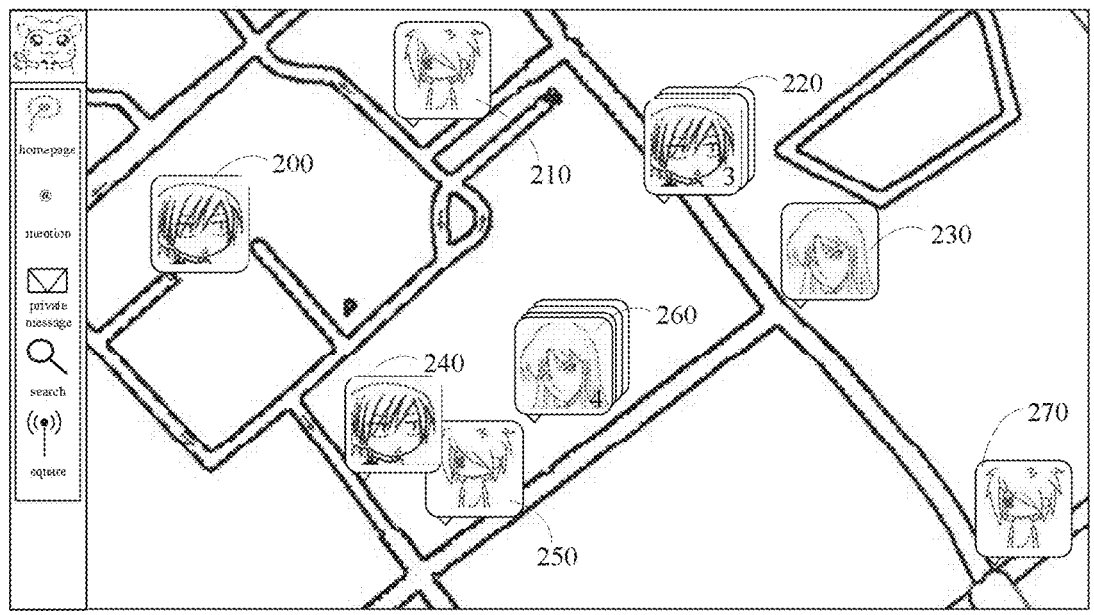
FIG. 2 is an interface schematic diagram showing user profile information.

As shown in FIG. 2, the microblog dynamic information shown on the electronic map is user avatars as indicated by reference numerals 200, 210, 220, 230, 240, 250 and 260. The corresponding locations of the multiple user avatars shown on the electronic map after being aggregated are shown in a multi-image superposing manner, and the quantity of the aggregated users can be marked on the shown user avatars. For example, reference numeral 260 shows four avatars being aggregated and shown in a multi-image superposing manner, with the number four (4) being marked on the avatars to indicate that four avatars are aggregated. Similarly, reference numeral 220 shows three avatars being aggregated and shown in a multi-image superposing manner, with the number three (3) being marked on the avatars to indicate that three avatars are aggregated.

Figure 3:
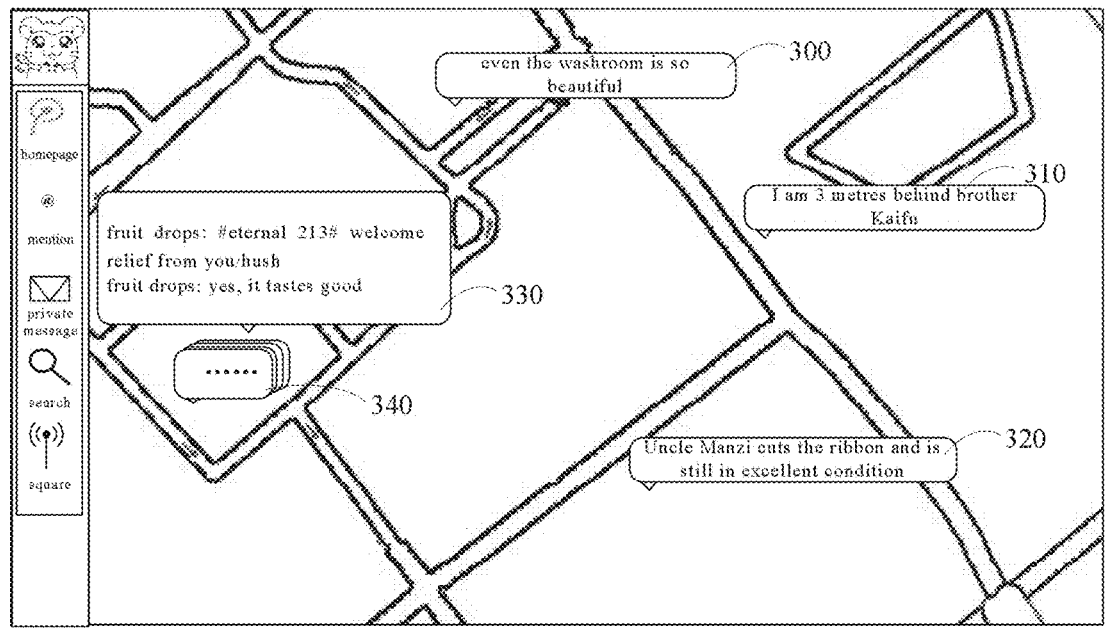
FIG. 3 is an interface schematic diagram showing microblog contents.

As shown in FIG. 3, the microblog dynamic information shown on the electronic map is the microblog contents 300, 310, 320, 330 and 340. One microblog content can be randomly selected and shown in the corresponding location on the electronic map after the multiple microblog contents are aggregated, and the aggregated microblog contents can be marked (for example, by ellipsis marks indicated by reference numeral 340 in FIG. 3). Further, the abbreviation forms of the microblog contents are displayed on the electronic map, thus the occupied area of the microblog content is smaller. For example, take the microblog platform as an example, a piece of microblog information is "even the washroom is so beautiful" indicated by reference numeral 300, then the form displayed on the electronic map may be "washroom . . . beautiful . . . ".

In an embodiment, the method for displaying microblog dynamics further includes: obtaining an unfolding instruction, unfolding the multiple pieces of microblog dynamic information which are shown in a partial overlapping manner, and showing the multiple pieces of microblog dynamic information on the electronic map.

Specifically, the unfolding instruction of the user is obtained, the aggregated microblog dynamic information to be unfolded is obtained according to the unfolding instruction, and the corresponding multiple pieces of microblog dynamic information in the aggregated microblog dynamic information are shown on the user interface. In an embodiment, the user can click a certain piece of aggregated microblog dynamic information on the user interface thereby triggers the unfolding instruction, and the aggregated microblog dynamic information is the aggregated microblog dynamic information to be unfolded. In an embodiment, multiple pieces of microblog dynamic information corresponding to the aggregated microblog dynamic information can be shown on the user interface in the form of a pop-up box.

Figure 4:
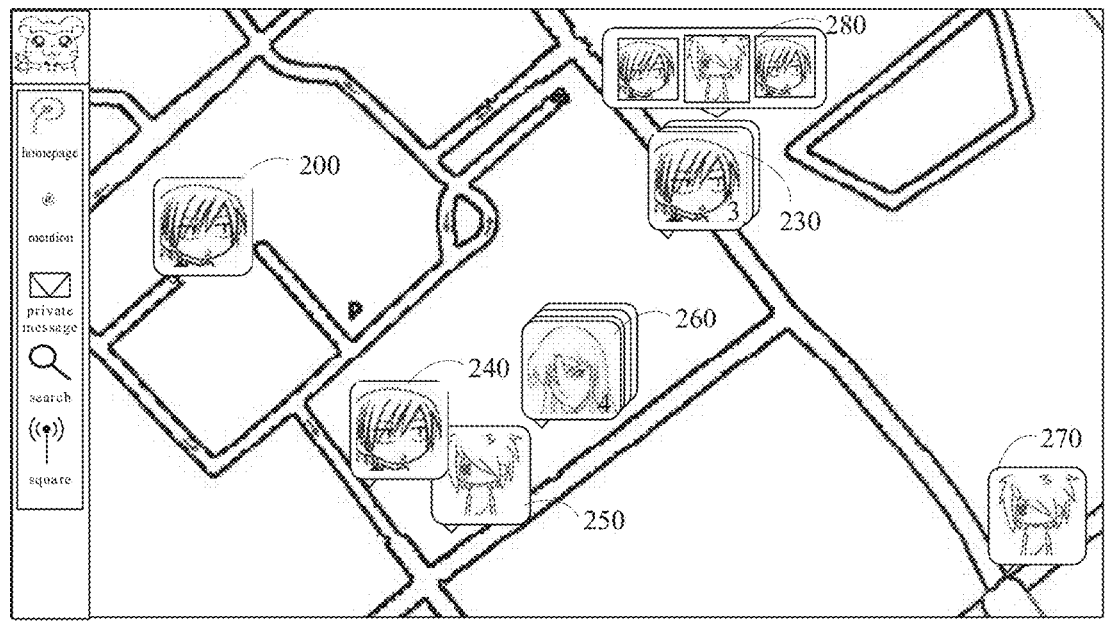
FIG. 4 is an interface schematic diagram showing multiple pieces of microblog dynamic information in a partial overlapping manner.

As shown in FIG. 4, the corresponding microblog dynamic information in the aggregated microblog dynamic information shown on the user interface is user head portraits, and the corresponding multiple images in the aggregated microblog dynamic information are displayed in the pop-up box in parallel. For example, reference numeral 230 shows three user head portraits being aggregated, and the multiple images are displayed in a pop-up box 280 in parallel.

As shown in FIG. 3, the corresponding microblog dynamic information in the aggregated microblog dynamic information shown on the user interface is the microblog contents as indicated by reference numeral 340, and the corresponding multiple microblog contents in the aggregated microblog dynamic information are displayed in the pop-up box in parallel as indicated by reference numeral 330.

In an embodiment, the method for displaying microblog dynamics further includes: obtaining a switching instruction, and switching the electronic map between display states that showing the user profile information and showing the microblog contents according to the switching instruction.

Specifically, the switching instruction of the user for switching the contents shown on the electronic map is obtained. The switching instruction includes user selected display type. The profile information or the microblog contents are shown on the electronic map according to the switching instruction, or the attribute information and the microblog contents are shown simultaneously.

In an embodiment, when the microblog contents are shown on the electronic map, at least one of the microblog contents is randomly displayed on the electronic map in an amplified manner.

Specifically, as shown in FIG. 3, the microblog contents shown on the electronic map are randomly selected and shown, and the selected microblog content is amplified. Further, if the microblog contents are shown on the electronic map in an abbreviation form, the omitted contents are complemented and then displayed in the corresponding location on the electronic map.

In an embodiment, when the user profile information is shown on the electronic map, a filtering instruction containing displaying profile selected by the user is obtained, and the user profile information is filtered according to the displaying profile selected by the user.

Specifically, the filtering instruction is obtained, and filtering is performed according to the filtering instruction. The filtering instruction contains profile conditions selected by the user, such as gender, age range and the like. For example, only the user profile information with the gender female is shown on the electronic map according to the profile conditions set by the user.

In an embodiment, the method for displaying microblog dynamics further includes: obtaining a detail illustration instruction for the microblog dynamic information, pulling microblog detail information corresponding to the microblog dynamic information from a microblog platform according to the detail illustration instruction, and displaying the microblog detail information obtained through the pulling correspondingly with the microblog dynamic information.

Figure 5:
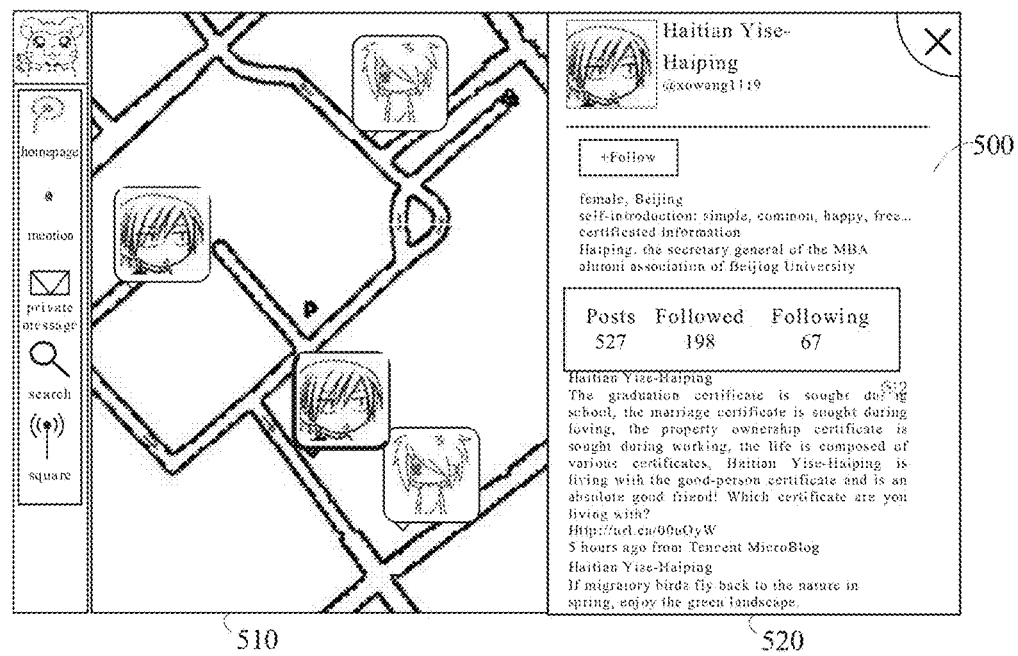
FIG. 5 is an interface schematic diagram showing microblog detail information corresponding to user attribute information.

In an embodiment, when the user clicks the microblog dynamic information shown on the electronic map, the detail illustration instruction is triggered. As shown in FIG. 5, when the microblog dynamic information for showing the microblog detail information on the user interface is the user profile information, the microblog detail information of the user profile information includes the personal data related information of microblog users corresponding to the user profile information, the recently-posted microblog contents and the like, as indicated by reference numeral 500. In an embodiment, after the detail illustration instruction is received, the electronic map can be controlled to shrink towards the left side of the user interface, so that the user interface is divided into two parts, the electronic map is shown on one part indicated by reference numeral 510, and the microblog detail information corresponding to the selected user profile information is shown on the other part as indicated by reference numeral 520.

Figure 6:
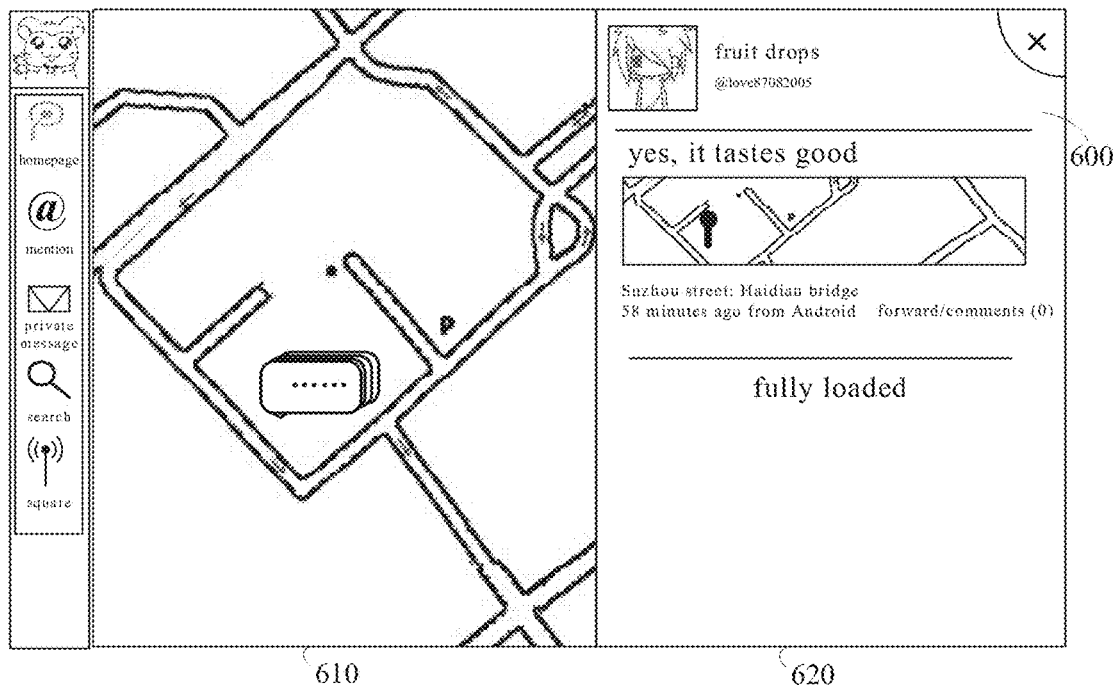
FIG. 6 is an interface schematic diagram showing microblog detail information corresponding to microblog contents.

As shown in FIG. 6, when the microblog dynamic information for showing the microblog detail information on the user interface is the microblog contents, the microblog detail information corresponding to the microblog contents is the time of being forwarded, comment details, posting users and the like of the microblog contents, for example, as indicated by reference numeral 600. In an embodiment, after the detail illustration instruction is obtained, the electronic map can be controlled to shrink towards the left side of the user interface, so that the user interface is divided into two parts, the electronic map is shown on one part as indicated by reference numeral 610, and the microblog detail information corresponding to the selected microblog contents is shown on the other part as indicated by reference numeral 620.

In addition, in an embodiment, an exit instruction can also be obtained, and the location information is cleared while the surrounding map mode is exited according to the exit instruction, so as to prevent the location information of the user from being further used.

Figure 7:
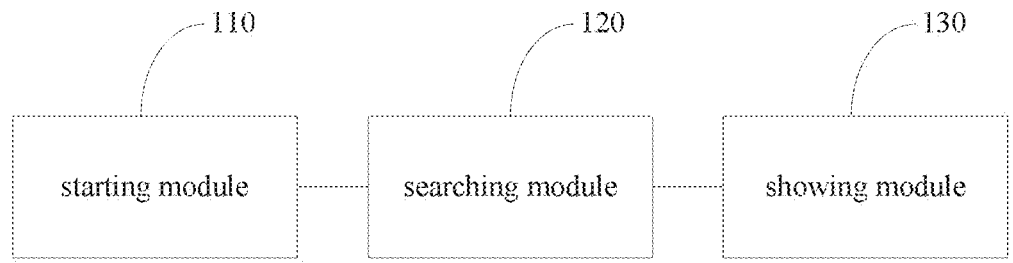
FIG. 7 is a module schematic diagram of a device for displaying microblog dynamics in an embodiment.

As shown in FIG. 7, in an embodiment, a device for displaying microblog dynamics, comprising a starting module 110, a searching module 120 and a showing module 130.

The starting module 110 is used for obtaining a microblog viewing request containing first location information, wherein the first location information includes any one of a real geographic location where a user is located and a geographic location set by the user.

In an embodiment, a specific key can be arranged on a terminal device, and the microblog viewing request is obtained by the starting module 110 while the user clicks the key. In another embodiment, the user interface of a microblog platform can be shown after the user logs in the microblog platform. A function button or a menu item corresponding to the microblog viewing request can be set on the user interface, and the microblog viewing request is obtained by the starting module 110 while the user clicks the function button or selects the menu item. The user enters a surrounding map mode after obtaining the microblog viewing request.

Specifically, the real geographic location where the user is located may be GPS positioning information, and the GPS positioning information of the user (that is, the longitude and latitude of the current location of the user) can be obtained by a GPS positioning module arranged in the terminal device. In addition, a geographic location input by the user can also be obtained by the user interface, or a clicking instruction of the user can be obtained by the electronic map, and a geographic location corresponding to the clicking instruction on the electronic map (that is, the geographic location set by the user) is further obtained.

The searching module 120 is used for searching for microblog dynamic information containing second location information, wherein the distance between the first location and the second location is within a pre-set range.

The microblog dynamic information may include user profile information and microblog contents, wherein the user profile information may be the personal data related information on the microblog platform, such as accounts, names, avatars, etc. The contents of the microblog are information posted by the users.

In the microblog platform, the microblog dynamic information has a corresponding relationship with a certain geographic location (longitude and latitude), for example, a geographic location corresponding to the user profile information is used for indicating the current location of the user, and a geographic location corresponding to a microblog content is used for indicating the location where the user posts the microblog content. In an embodiment, the second location information of the user profile information is obtained in real time. Specifically, a user logging in the microblog platform in a set area is inquired by the searching module 120, and the second location information of the user profile information is obtained according to the geographic location uploaded by the user in real time. The second location information of the microblog contents can be obtained from the terminal device. When microblog content is released, the geographic location of the release location can be correspondingly stored. Specifically, when the searching module 120 searches the microblog contents, the microblog contents are obtained together with the second location information of the microblog content simultaneously from the terminal device.

Specifically, the searching module 120 can search the microblog dynamic information in a range taking the first location information as a circle centre and taking a preset distance as a radius. Further, the second location information corresponding to the microblog dynamic information can be obtained by the searching module 120, the distance between the first location information and the second location information of the microblog dynamic information is calculated according to the first location information and the second location information, and the microblog dynamic information of which the distance is within the preset range is selected.

The showing module 130 is used for obtaining an electronic map corresponding to the first location information, and showing (i.e., displaying) the microblog dynamic information in a location corresponding to the second location information on the electronic map.

Specifically, the electronic map can be pre-stored on the terminal device, and the electronic map can be directly extracted from the terminal device and shown by the showing module 130. Or the data of the electronic map can be directly obtained from a third-party map platform, and the electronic map is shown on the user interface.

Further, after the first location information is obtained, the showing module 130 displays the electronic map on the user interface according to the first location information, the central location of the display area of the electronic map in the user interface is corresponding to the first location information, and the location information can be marked on the electronic map. Further, operation instructions of the user on the electronic map can also be obtained, and operations such as dragging, scaling and the like can be executed on the electronic map.

Specifically, any point on the electronic map is correspondingly provided with a unique longitude and a unique latitude, and the second location information of the microblog dynamic information is also longitude and latitude information. The showing module 130 positions the point with identical longitude and latitude to the microblog dynamic information on the electronic map, and the point is the corresponding location of the microblog dynamic information on the electronic map. Accordingly, the microblog dynamic information is shown in the corresponding location.

In an embodiment, a scaling instruction onto the electronic map can be obtained, and the proportional scale of the electronic map is adjusted according to the scaling instruction. When the proportional scale of the electronic map is changed, the showing module 130 re-obtains the corresponding location of the microblog dynamic information on the electronic map, and the location of the microblog dynamic information is adjusted so that the microblog dynamic information is re-shown in the corresponding location on the electronic map.

Figure 8:
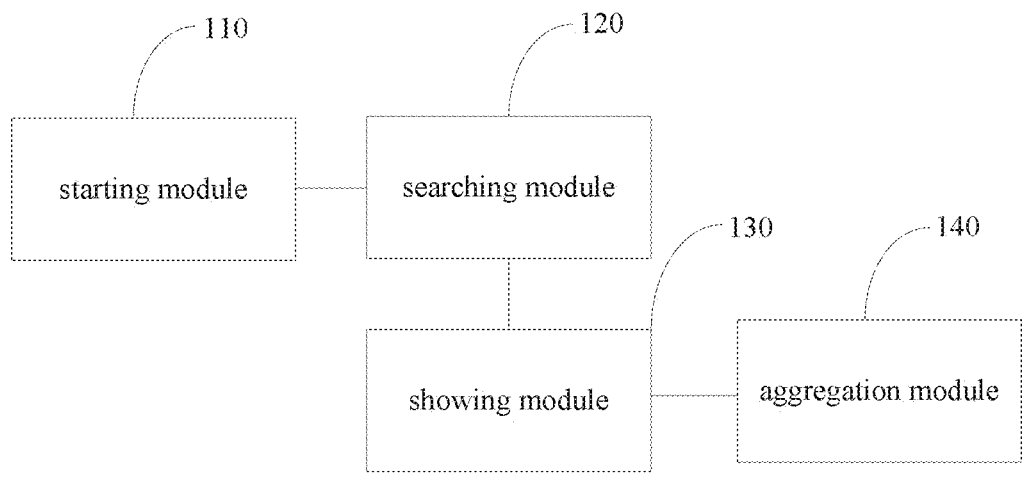
FIG. 8 is a module schematic diagram of a device for displaying microblog dynamics in another embodiment.

As shown in FIG. 8, in another embodiment, the device for displaying microblog dynamics further includes an aggregation module 140.

The aggregation module 140 is used for obtaining the proportional scale of the electronic map, calculating a display distance among the microblog dynamic information on the electronic map according to the second location information and the proportional scale of the electronic map, and when the display distance is less than or equal to a preset distinguishable distance, for showing multiple pieces of microblog dynamic information in a location corresponding to the second location information on the electronic map in a partial overlapping manner.

Specifically, the aggregation module 140 can obtain an actual distance between two pieces of the microblog dynamic information according to the second location information of the microblog dynamic information, the actual distance means a distance between the corresponding actual geographic locations of the two pieces of the microblog dynamic information, and the display distance between the microblog dynamic information on the electronic map results from a product of the actual distance between the two pieces of the microblog dynamic information and the proportional scale of the electronic map. For example, the two pieces of the microblog dynamic information shown on the electronic map are a user A and a user B respectively, the actual distance between the user A and the user B obtained according to the second location information of the user A and the user B is 1000 m, and the current proportional scale of the electronic map is 1:50000, then the display distance between the user A and the user B on the electronic map is 0.02 m.

The distinguishable distance means the minimum distinguishable distance of user operations, preferably, with a configuration for a touch-screen device, the distinguishable distance can be set to the fingertip width of a normal human finger. Further, multiple pieces of microblog dynamic information with the display distance which is less than or equal to the preset distinguishable distance can be shown by the aggregation module 140 in a location corresponding to the second location information on the electronic map in a partial overlapping manner.

Specifically, in an embodiment, after the aggregation module 140 aggregates the multiple pieces of microblog dynamic information with the display distance which is less than or equal to the preset distinguishable distance, the multiple pieces of microblog dynamic information can be partially overlapped as the aggregated microblog dynamic information to be shown on the electronic map. The second location information of the aggregated microblog dynamic information may be the second location information of any one of the aggregated multiple pieces of microblog dynamic information, or may be the central location of the second location information of the aggregated multiple pieces of microblog dynamic information.

As shown in FIG. 2, the microblog dynamic information shown by the showing module 130 on the electronic map is user avatars, the corresponding locations of the multiple user avatars shown on the electronic map after being aggregated are shown in a multi-image superposing manner, and the quantity of the aggregated users can be marked on the shown user avatars.

As shown in FIG. 3, the microblog dynamic information shown by the showing module 130 on the electronic map is the microblog contents, one microblog content can be randomly selected and shown in the corresponding location on the electronic map after the multiple microblog contents are aggregated, and the aggregated microblog contents can be marked (for example, ellipsis marks in FIG. 3). Further, the abbreviation forms of the microblog contents are displayed on the electronic map, thus the occupied area of the microblog content is smaller. For example, take the microblog platform as an example, a piece of microblog information is "even a washroom is so beautiful", then the form displayed on the electronic map may be "washroom . . . beautiful . . . ".

Figure 9:
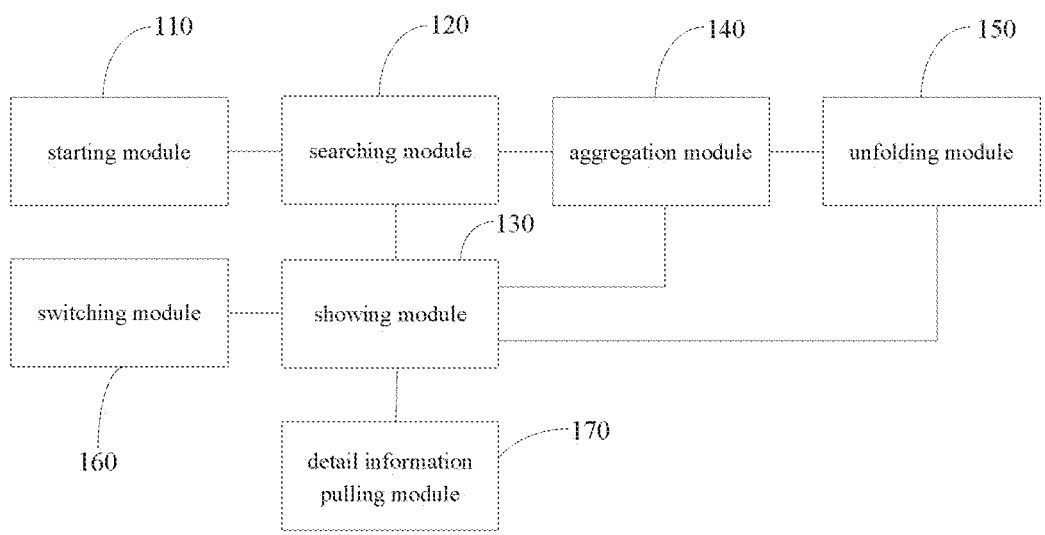
FIG. 9 is a module schematic diagram of a device for displaying microblog dynamics in a further embodiment.

As shown in FIG. 9, in another embodiment, the device for displaying microblog dynamics further includes an unfolding module 150, a switching module 160 and a detail information pulling module 170.

The unfolding module 150 is used for obtaining an unfolding instruction, unfolding the multiple pieces of microblog dynamic information which are shown in a partial overlapping manner according to the unfolding instruction, and showing the multiple pieces of microblog dynamic information on the electronic map.

Specifically, the unfolding module 150 obtains the unfolding instruction from the user, and obtains the aggregated microblog dynamic information to be unfolded according to the unfolding instruction, and shows the corresponding multiple pieces of microblog dynamic information in the aggregated microblog dynamic information on the user interface. In an embodiment, the user can click a certain piece of aggregated microblog dynamic information on the user interface thereby triggers the unfolding instruction, and the aggregated microblog dynamic information is the aggregated microblog dynamic information to be unfolded. In an embodiment, the unfolding module 150 shows multiple pieces of microblog dynamic information corresponding to the aggregated microblog dynamic information on the user interface in the form of a pop-up box.

As shown in FIG. 4, the corresponding microblog dynamic information in the aggregated microblog dynamic information shown on the user interface is user head portraits, and the unfolding module 150 displays the corresponding multiple images in the aggregated microblog dynamic information in parallel in the pop-up box.

As shown in FIG. 3, the corresponding microblog dynamic information in the aggregated microblog dynamic information shown on the user interface is the microblog contents, and the unfolding module 150 displays the corresponding multiple microblog contents in the aggregated microblog dynamic information in parallel in the pop-up box.

The switching module 160 is used for obtaining a switching instruction, and switching the electronic map between display states that showing the user profile information and showing the microblog contents according to the switching instruction.

Specifically, the switching module 160 obtains a switching instruction from the user for switching the contents shown on the electronic map. The switching instruction includes user selected display type. The profile information or the microblog contents are shown on the electronic map according to the switching instruction, or the attribute information and the microblog contents are shown simultaneously.

In this embodiment, the device for displaying microblog dynamics further includes an amplified displaying module and a filter module.

The amplified displaying module is used for, when the microblog contents are shown on the electronic map, randomly displaying at least one of the microblog contents on the electronic map in an amplified manner.

Specifically, as shown in FIG. 3, the microblog contents shown on the electronic map are randomly selected and shown, and the selected microblog contents are amplified. Further, if the microblog contents are shown on the electronic map in an abbreviation form, the omitted contents are complemented and then displayed in the corresponding location on the electronic map.

The filter module is used for, when the user profile information is shown on the electronic map, obtaining a filtering instruction containing displaying profile selected by the user, and filtering the user profile information according to the displaying profile selected by the user.

Specifically, the filtering instruction is obtained, and filtering is performed according to the filtering instruction. The filtering instruction contains profile conditions selected by the user, such as gender, age range and the like. For example, only the user profile information with the gender female is shown on the electronic map according to the profile conditions set by the user.

It should be noted that, in other embodiments, the amplified displaying module and the filter module can be omitted, or only any one of the two modules may be included.

A detail information pulling module 170 is used for obtaining a detail illustration instruction for the microblog dynamic information, and pulling microblog detail information corresponding to the microblog dynamic information from a microblog platform according to the detail illustration instruction.

In an embodiment, when the user clicks the microblog dynamic information shown on the electronic map, the detail illustration instruction is triggered. When the microblog dynamic information for showing the microblog detail information on the user interface is the user profile information, the microblog detail information of the user profile information includes the personal data related information of microblog users corresponding to the user profile information, the recently-posted microblog contents and the like. When the microblog dynamic information for showing the microblog detail information on the user interface is the microblog contents, the microblog detail information corresponding to the microblog contents is the time of being forwarded, comment details, release users and the like of the microblog contents.

In this embodiment, the showing module 130 is further used for correspondingly showing the microblog detail information obtained by pulling and the microblog dynamic information.

As shown in FIG. 5, in an embodiment, after the detail information pulling module 170 receives the detail illustration instruction, the electronic map can be controlled to shrink towards the left side of the user interface, so that the user interface is divided into two parts, the showing module 130 displays the electronic map on one part, and displays the microblog detail information corresponding to the selected user attribute information on the other part.

As shown in FIG. 6, in an embodiment, after the detail information pulling module 170 obtains the detail showing instruction, the electronic map can be controlled to shrink towards the left side of the user interface, so that the user interface is divided into two parts. The showing module 130 displays the electronic map on one part, and displays the microblog detail information corresponding to the selected microblog contents on the other part.

It should be noted that, in other embodiments, any one or a combination of any two of the unfolding module 150, the switching module 160 and the detail information pulling module 170 may be included.

In addition, in an embodiment, the device for displaying microblog dynamics may also include an exit module. The exiting module is used for obtaining an exit instruction, and clearing the location information while exiting the surrounding map mode according to the exit instruction, so as to prevent the location information of the user from being further used.

According to the above-mentioned method and device for displaying microblog dynamics, a microblog viewing request containing first location information is obtained, and microblog dynamic information containing second location information, wherein a distance between the first location and the second location is within a preset range, is searched for. An electronic map corresponding to the first location information is obtained, and the microblog dynamic information is shown in a location corresponding to the second location information on the electronic map. The location where the microblog dynamic information is shown on the electronic map is corresponding to an actual geographic location thereof, so that a user can obtain the actual geographic location of the microblog dynamic information by viewing the electronic map. Thus, by means of the method and device for displaying microblog dynamics, the specific location of the microblog dynamic information adjacent to the user can be displayed. Further, all microblog dynamic information can be shown on the electronic map, thus facilitating the user's operation.

Those of ordinary skill in the art may understand that all or a part of steps in the method for realizing the above-mentioned embodiments may be completed by instructing related hardware by a computer program, the program may be stored in a computer readable storage medium, and when the program is executed by at least one computer, the flows of the above-mentioned method embodiments may be included. Wherein, the storage medium may be a disk, an optical disk, a read-only memory (ROM), a random access memory (RAM) or the like.

The embodiments above merely express some implementations of the present invention, and the descriptions thereof are specific and detailed and can not be understood to be limitations to the scope of the present invention patent. It should be noted that, various variations and improvements could be made by those of ordinary skill in the art without departing from the conception of the present invention, and these variations and improvements belong to the protection scope of the present invention. Therefore, the protection scope of the appended claims should prevail over the protection scope of the present invention patent.

What is claimed is:

1. A method for displaying microblog dynamic information, the method comprising:
    obtaining a microblog viewing request including first location information indicating a first location which is a real geographic location where a user making the microblog viewing request is located or a geographic location set by the user making the microblog viewing request;
    searching for respective microblog dynamic information, each respective microblog dynamic information including at least one of microblog content, user profile information of a user that posted the microblog content, and second location information indicating a second location which is a location of the user that posted the microblog content or a location of the microblog content, wherein the searching searches for respective microblog dynamic information in which a distance between the first location and the second location indicated by the second location information of the respective microblog dynamic information is within a preset range, to thereby find a plurality of respective microblog dynamic information including a first microblog dynamic information and a second microblog dynamic information within the preset range;
    obtaining an electronic map corresponding to the first location;
    obtaining a proportional scale of the electronic map;
    calculating a display distance between a piece of the first microblog dynamic information to be displayed on the electronic map and a piece of the second microblog dynamic information to be displayed on the electronic map according to the second location indicated by the second location information of the first microblog dynamic information, the second location indicated by the second location information of the second microblog dynamic information, and the proportional scale of the electronic map;
    when the display distance is less than or equal to a preset distinguishable distance, displaying the piece of the first microblog dynamic information and the piece of the second microblog dynamic information on the electronic map in a partial overlapping manner; and
    when the display distance is more than the preset distinguishable distance, displaying the piece of the first microblog dynamic information in a location corresponding to the second location of the first microblog dynamic information and the piece of the second microblog dynamic information in a location corresponding to the second location of the second microblog dynamic information separately on the electronic map,
    wherein the display distance and the preset distinguishable distance are calculated based on the proportional scale of the electronic map.

2. The method of claim 1, further comprising:
    obtaining an unfolding instruction for the piece of the first microblog dynamic information and the piece of the second microblog dynamic information displayed on the electronic map in the partial overlapping manner;
    unfolding the piece of the first microblog dynamic information and the piece of the second microblog dynamic information according to the unfolding instruction; and
    displaying the unfolded piece of the first microblog dynamic information and the unfolded piece of the second microblog dynamic information in a pop-up box on the electronic map.

3. The method of claim 1, further comprising:
    obtaining a switching instruction; and
    switching the electronic map between
    a first state displaying at least a piece of the user profile information of the found plurality of respective microblog dynamic information and
    a second state displaying at least a piece of the microblog content of the found plurality of respective microblog dynamic information according to the switching instruction.

4. The method of claim 3, further comprising at least one of the following:
    when the display state is the second state, randomly displaying a part of the microblog content of a respective microblog dynamic information on the electronic map in an amplified manner; and
    when the display state is the first state, obtaining a filtering instruction including a profile condition selected by the user, and filtering the user profile information of a respective microblog dynamic information according to the profile condition included in the filtering instruction.

5. The method of claim 1, further comprising:
    obtaining a detail illustration instruction;
    pulling microblog detail information corresponding to a respective microblog dynamic information of which at least a piece is being displayed on the electronic map, from a microblog platform, according to the detail illustration instruction; and
    displaying the pulled microblog detail information.

6. The method of claim 1, wherein the microblog dynamic information is stored in a microblog platform and has a corresponding relationship with a certain geographic location.

7. The method of claim 1, wherein
    the second location is the location of the user that posted the microblog content, and
    the searching searches for respective microblog dynamic information by
    obtaining the second location information in real time, and searching for respective microblog dynamic information in which the distance between the first location and the second location is within the preset range.

8. The method of claim 7, wherein
the location of the user that posted the microblog content includes a geographic location of the user, wherein the user is logged in the microblog platform in a set area, and
the searching for respective microblog dynamic information includes
searching for respective microblog dynamic information in which the distance between the first location and the geographic location is within the preset range.

9. The method of claim 1, wherein the distinguishable distance is set to a fingertip width of a normal human finger.

10. A device for displaying microblog dynamic information, the device comprising:
a memory storing instructions; and
a processor that executes the instructions to:
obtain a microblog viewing request including first location information indicating a first location which is a real geographic location where a user making the microblog viewing request is located or a geographic location set by the user making the microblog viewing request;
search for respective microblog dynamic information, each respective microblog dynamic information including at least one of microblog content, user profile information of a user that posted the microblog content, and second location information indicating a second location which is a location of the user that posted the microblog content or a location of the microblog content, wherein the search searches for respective microblog dynamic information in which a distance between the first location and the second location indicated by the second location information of the respective microblog dynamic information is within a preset range, to thereby find a plurality of respective microblog dynamic information including a first microblog dynamic information and a second microblog dynamic information within the preset range;
obtain an electronic map corresponding to the first location;
obtain a proportional scale of the electronic map;
calculate a display distance between a piece of the first microblog dynamic information to be displayed on the electronic map and a piece of the second microblog dynamic information to be displayed on the electronic map according to the second location indicated by the second location information of the first microblog dynamic information, the second location indicated by the second location information of the second microblog dynamic information, and the proportional scale of the electronic map;
when the display distance is less than or equal to a preset distinguishable distance, display the piece of the first microblog dynamic information and the piece of the second microblog dynamic information on the electronic map in a partial overlapping manner; and
when the display distance is more than the preset distinguishable distance, displaying the piece of the first microblog dynamic information in a location corresponding to the second location of the first microblog dynamic information and the piece of the second microblog dynamic information in a location corresponding to the second location of the second microblog dynamic information separately on the electronic map,
wherein the display distance and the preset distinguishable distance are calculated based on the proportional scale of the electronic map.

11. The device of claim 10, wherein the processor further executes the instructions to:
obtain an unfolding instruction for the piece of the first microblog dynamic information and the piece of the second microblog dynamic information displayed on the electronic map in the partial overlapping manner;
unfold the piece of the first microblog dynamic information and the piece of the second microblog dynamic information according to the unfolding instruction; and
display the unfolded piece of the first microblog dynamic information and the unfolded piece of the second microblog dynamic information in a pop-up box on the electronic map.

12. The device of claim 10, wherein the processor further executes the instructions to:
obtain a switching instruction; and
switch the electronic map between
a first state displaying at least a piece of the user profile information of the found plurality of respective microblog dynamic information and
a second state displaying at least a piece of the microblog content of the found plurality of respective microblog dynamic information according to the switching instruction.

13. The device of claim 12, wherein the processor further executes the instructions to execute at least one of:
when the display state is the second state, randomly display a part of the microblog content of a respective microblog dynamic information on the electronic map in an amplified manner; and
when the display state is the first state, obtain a filtering instruction including a profile condition selected by the user, and filter the user profile information of a respective microblog dynamic information according to the profile condition included in the filtering instruction.

14. The device of claim 10, wherein the processor further executes the instructions to:
obtain a detail illustration instruction;
pull microblog detail information corresponding to a respective microblog dynamic information of which at least a piece is being displayed on the electronic map, from a microblog platform according to the detail illustration instruction; and
display the pulled microblog detail information.

15. One or more non-transitory computer-readable storage media having computer executable instructions stored thereon for displaying microblog dynamic information which, when executed by at least one computer, cause the at least one computer to perform:
obtaining a microblog viewing request including first location information indicating a first location which is a real geographic location where a user making the microblog viewing request is located or a geographic location set by the user making the microblog viewing request;
searching for respective microblog dynamic information, each respective microblog dynamic information including at least one of microblog content, user profile information of a user that posted the microblog content, and second location information indicating a second location which is a location of the user that posted the microblog content or a location of the microblog content, wherein the searching searches for respective microblog dynamic information in which a distance between the first location information and the second location indicated by the second location information of the respective microblog dynamic information is within a preset range, to thereby find a plurality of respective microblog dynamic information including a first microblog dynamic information and a second microblog dynamic information within the preset range; and obtaining an electronic map corresponding to the first location;

obtaining a proportional scale of the electronic map;

calculating a display distance between a piece of the first microblog dynamic information to be displayed on the electronic map and a piece of the second microblog dynamic information to be displayed on the electronic map according to the second location indicated by the second location information of the first microblog dynamic information, the second location indicated by the second location information of the second microblog dynamic information, and the proportional scale of the electronic map;

when the display distance is less than or equal to a preset distinguishable distance, displaying the piece of the first microblog dynamic information and the piece of the second microblog dynamic information on the electronic map in a partial overlapping manner; and when the display distance is more than the preset distinguishable distance, displaying the piece of the first microblog dynamic information in a location corresponding to the second location of the first microblog dynamic information and the piece of the second microblog dynamic information in a location corresponding to the second location of the second microblog dynamic information separately on the electronic map, wherein the display distance and the preset distinguishable distance are calculated based on the proportional scale of the electronic map.

16. The one or more non-transitory computer-readable storage media of claim 15, wherein, when executed by the at least one computer, the computer executable instructions further cause the at least one computer to perform:

obtaining an unfolding instruction for the piece of the first microblog dynamic information and the piece of the second microblog dynamic information displayed on the electronic map in the partial overlapping manner;

unfolding the piece of the first microblog dynamic information and the piece of the second microblog dynamic information according to the unfolding instruction; and displaying the unfolded piece of the first microblog dynamic information and the unfolded piece of the second microblog dynamic information in a pop-up box on the electronic map.

17. The one or more non-transitory computer-readable storage media of claim 15, wherein, when executed by the at least one computer, the computer executable instructions further cause the at least one computer to perform:

obtaining a switching instruction; and switching the electronic map between a first state displaying at least a piece of the user profile information of the found plurality of respective microblog dynamic information and a second state displaying at least a piece of the microblog content of the found plurality of respective microblog dynamic information according to the switching instruction.

18. The one or more non-transitory computer-readable storage media of claim 17, wherein, when executed by the at least one computer, the computer executable instructions further cause the at least one computer to perform at least one of:

when the display state is the second state, randomly displaying a part of the microblog content of a respective microblog dynamic information on the electronic map in an amplified manner; and when the display state is the first state, obtaining a filtering instruction including a profile condition selected by the user, and filtering the user profile information of a respective microblog dynamic information according to the profile condition included in the filtering instruction.

19. The one or more non-transitory computer-readable storage media of claim 15, wherein, when executed by the at least one computer, the computer executable instruction further cause the at least one computer to perform:

obtaining a detail illustration instruction;

pulling microblog detail information corresponding to a respective microblog dynamic information of which at least a piece is being displayed on the electronic map from a microblog platform, according to the detail illustration instruction; and displaying the pulled microblog detail information.

* * * * *